(12) United States Patent
Palmer et al.

(10) Patent No.: US 7,890,865 B2
(45) Date of Patent: Feb. 15, 2011

(54) METHODS AND APPARATUSES FOR PROVIDING MESSAGE INFORMATION IN GRAPHICAL USER INTERFACES BASED ON USER INPUTS

(75) Inventors: Steve Palmer, Sammamish, WA (US); Valery Tolkov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2692 days.

(21) Appl. No.: 10/143,325

(22) Filed: May 9, 2002

(65) Prior Publication Data

US 2003/0210260 A1   Nov. 13, 2003

(51) Int. Cl.
G06F 3/00 (2006.01)
G06F 3/048 (2006.01)

(52) U.S. Cl. ............ 715/715; 715/705; 715/802; 715/808

(58) Field of Classification Search ......... 715/705–711, 715/715, 802, 808, 859–860
See application file for complete search history.

(56) References Cited

U.S. PATENT DOCUMENTS

| | | | |
|---|---|---|---|
| 5,008,810 A * | 4/1991 | Kessel et al. | 715/506 |
| 5,121,475 A * | 6/1992 | Child et al. | 715/507 |
| 5,425,102 A | 6/1995 | Moy | |
| 5,557,731 A * | 9/1996 | Li et al. | 715/762 |
| 5,736,984 A | 4/1998 | Jellinek et al. | |
| 5,740,035 A | 4/1998 | Cohen et al. | |
| 5,754,176 A * | 5/1998 | Crawford | 715/711 |
| 5,793,952 A | 8/1998 | Limsico | |
| 5,895,455 A | 4/1999 | Bellinger et al. | |
| 5,956,709 A | 9/1999 | Xue | |
| 5,986,568 A | 11/1999 | Suzuki et al. | |
| 5,991,882 A | 11/1999 | O'Connell | |
| 5,995,101 A * | 11/1999 | Clark et al. | 715/711 |
| 6,100,885 A | 8/2000 | Donnelly et al. | |
| 6,337,702 B1 | 1/2002 | Bates et al. | |

FOREIGN PATENT DOCUMENTS

| | | |
|---|---|---|
| EP | 0 816 991 A1 | 1/1998 |
| GB | 2 341 952 A | 3/2000 |

* cited by examiner

*Primary Examiner*—Weilun Lo
*Assistant Examiner*—Truc T Chuong

(57) ABSTRACT

Improved methods and apparatuses are provided for determining when and how to display non-modal messages relating to user input portions of a graphical user interface (GUI). One method includes displaying at least one user input portion within a GUI and determining if the user input portion is in an invalid state by determining that valid user input associated with the user input portion has not been received. The method further includes displaying a non-modal message within the GUI. The non-modal message is visibly graphically associated with the user input portion. The method also includes automatically applying a focus of the GUI on the user input portion. As long as the focus of the GUI remains on the user input portion, the method includes displaying the non-modal message until the user input portion is determined to be in a valid state.

30 Claims, 4 Drawing Sheets

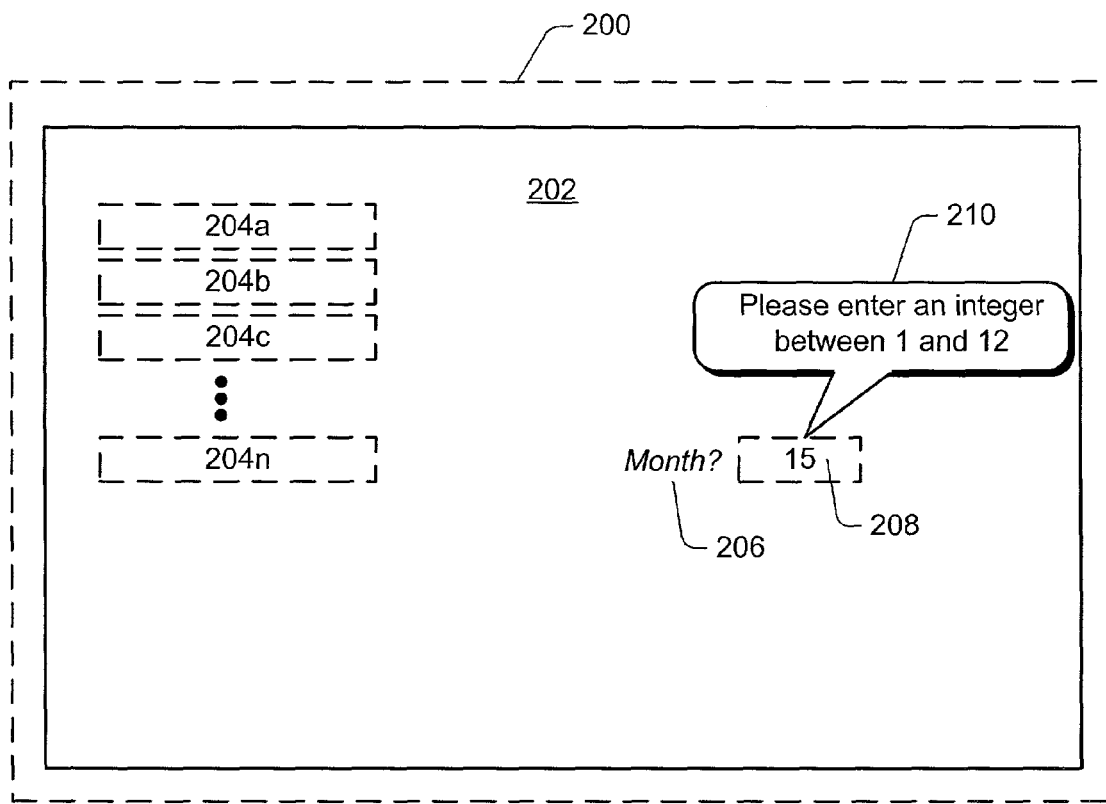
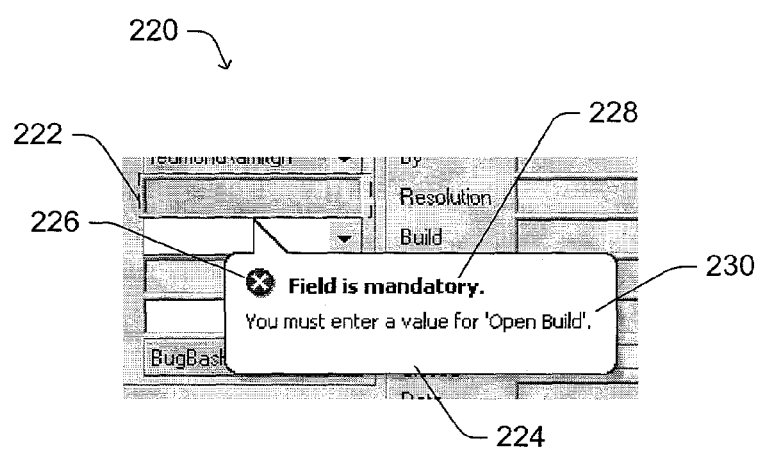
Fig. 2

METHODS AND APPARATUSES FOR PROVIDING MESSAGE INFORMATION IN GRAPHICAL USER INTERFACES BASED ON USER INPUTS

TECHNICAL FIELD

This invention relates to computers and software, and more particularly to methods and apparatuses for providing information in a graphical user interface (GUI) computing environment using non-modal messages.

BACKGROUND

Traditional computing devices, and in particular the graphical user interfaces (GUIs) provided by the computing devices have relied on the use of message boxes to communicate to the user that an error has occurred or to otherwise inform the user about some matter. Typically, such pop-up message boxes are modal in that they require the user to actively dismiss them, for example, by hitting either an "Okay" or "Cancel" button within the message box. Often, the user needs to dismiss the message box prior to taking any corrective action and/or otherwise continuing on with whatever task is at hand.

There are other drawbacks to such traditional message boxes too. By way of example, modal message boxes can be distracting to the user, and/or unintentionally/prematurely dismissed. For example, if the user is busy typing or clicking elsewhere when the box appears, they might accidentally dismiss the modal message box before having a chance to read it. Furthermore, a typical modal message box does not graphically indicate the source of an error and/or problem, should it be visible within the GUI. For example, if the user entered the wrong information in a user input field presented by the GUI.

For these and other reasons, more recent operating systems and applications have introduced the use of a non-modal error message within a GUI. One exemplary type of non-modal message is a pop-up error message. Balloon error messages improve the way that error information is presented to the user by replacing the usual modal message box with a pop-up error message that is not modal and thus does not need to be dismissed by the user before the error can be corrected. A typical pop-up error message has the additional advantage of being strategically located to help identify the location within the GUI that is associated with the error. This allows the user to quickly identify where corrections may be needed.

A further exemplary drawback to conventional modal message boxes is that the message box needs to be dismissed by the user before the user is allowed to make any corrections. Similarly, conventional pop-up error message techniques may remove the pop-up error message automatically after having displayed it for a period of time and/or removing the balloon error message from the display when the user begins making applicable corrections. Thus, if the modal message box or pop-up error message includes information that may be beneficial during subsequent input by the user, then the user will need to remember or perhaps write down such information.

While conventional pop-up error messages usually help locate an error within the GUI, one shortcoming is that the user is required to manually place or otherwise associate (e.g., using a cursor, entry point, etc.) the focus of the GUI on the data field being pointed too, if they have not done so previously. One example is the current version of an application named MathCad available from MathSoft Engineering & Education, Inc. of Cambridge, Mass. This application uses painted graphic messages to indicate mathematical errors or undefined variables inside the mathematical equation displayed by the application. Here, all errors are displayed together at the same time. However, the user is required to then manually place the focus of the GUI appropriately within the equation before any changes to the equation can be made based on the error(s).

Consequently, for the above stated reasons and others it would be advantageous to have improved methods and apparatuses that display non-modal messages relating to user input portions of a GUI at the appropriate time and location, and that remain displayed for an adequate amount of time for the user to act upon the message information. Additionally, there is a need for more user friendly error and/or guidance messages that allow for expedited user entry/re-entry of valid information without requiring manual adjustment of the focus of the GUI.

SUMMARY

Improved methods and apparatuses are provided for determining when and/or how to display non-modal messages relating to user input portions of a graphical user interface (GUI).

The above stated needs and others are satisfied, for example, by a method in accordance with certain aspects of the present invention that includes displaying at least one user input portion within a GUI and determining if the user input portion is in an invalid state by determining that valid user input associated with the user input portion has not been received. The method further includes displaying a non-modal message within the GUI. The non-modal message is visibly graphically associated with the user input portion. The method also includes automatically applying a focus of the GUI on the user input portion. As long as the focus of the GUI remains on the user input portion, the method includes displaying the non-modal message until the user input portion is determined to be in a valid state.

In accordance with certain other exemplary aspects of the present invention, a computer-readable medium is provided, which has computer-executable instructions for causing a GUI having at least one user input portion to be displayed, selectively causing a focus of the GUI to be applied on the user input portion if valid user input associated with said user input portion has not been received, and displaying a non-modal message within the GUI that is visibly connected to the user input portion until the user input portion is determined to be in a valid state or the focus of said GUI is removed from the user input portion.

In accordance with still other aspects of the present invention, an apparatus is provided. The apparatus includes logic, memory, at least one user input device and at least one display device. The logic is configured to cause a GUI to be visibly presented via the display device. The GUI includes at least one user input portion. The logic is further configured to determine if the user input portion is in an invalid state by determining that valid user input associated with the user input portion has not been received. The logic will then cause a non-modal message to be presented within the GUI. Here, the non-modal message is visibly associated with the user input portion. The logic applies a user input focus of the GUI on the user input portion. As long as the focus of the GUI is on the user input portion, the logic will continue presenting the non-modal message until the user input portion is determined to be in a valid state.

BRIEF DESCRIPTION OF THE DRAWINGS

A more complete understanding of the various exemplary methods and apparatuses of the present invention may be had by reference to the following detailed description when taken in conjunction with the accompanying drawings wherein:

FIG. 2 depicts illustrative representations of graphical user interfaces (GUIs) having user input portions and information being displayed in non-modal messages, in accordance with certain exemplary implementations of the present invention.

DETAILED DESCRIPTION

Figure 1:
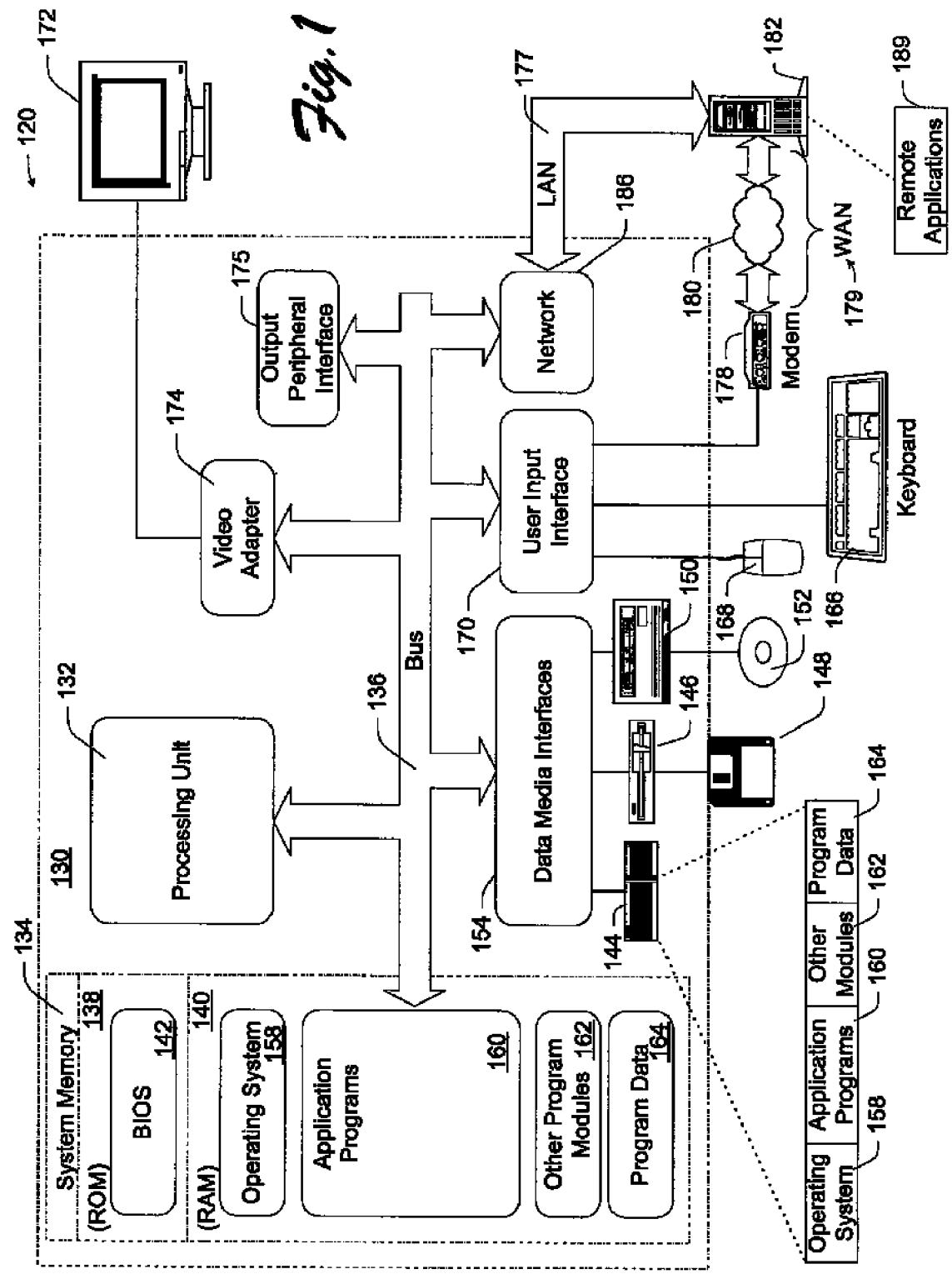
FIG. 1 is a block diagram depicting a computer system/environment suitable for use in accordance with certain exemplary implementations of the present invention.

Turning to the drawings, wherein like reference numerals refer to like elements, the invention is illustrated as being implemented in a suitable computing environment.

Although not required, the invention will be described in the general context of computer-executable instructions, such as program modules, being executed by a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and apparatuses may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and apparatuses herein are operational with numerous other general purpose or special purpose computing system environments or configurations. Examples of well known computing systems, environments, and/or configurations that may be suitable include, but are not limited to, personal computers, server computers, thin clients, thick clients, handheld or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or nonvolatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Reference is now to FIG. 2, which depicts illustrative representations of graphical user interfaces (GUIs) having user input portions and information being displayed in non-modal messages, in accordance with certain exemplary implementations of the present invention.

By way of example, a GUI 202 is represented as being displayed by a display device (dashed-line box) 200. Within GUI 202 is a plurality of user input portions 204a-n and 208. In certain implementations, user input portions 204a-n and/or 208 take the form of a data entry field suitable for the user to type or otherwise enter alphanumeric character strings and the like. Thus, for example, user input portion 208 is illustrated as being a user input field designed to allow the user to enter a numerical number relating to a month of the year. A prompt 206 is shown as soliciting such user input.

In other implementations, for example, user input portions 204a-n may include user selectable/activated buttons, knobs, sliders, or other like graphically displayed user input mechanisms. It should be recognized, therefore, that the rectangular shaped dashed-line boxes defining user input portions in FIG. 2 are merely representative shapes and that the user input portions may take on any applicable shape, pattern, color, etc. Moreover, certain GUIs may only have a single user input portion, while other implementations have many user input portions.

As illustrated, user input portion 208 includes a user input (data) of "15". In accordance with certain aspects of the present invention, this user input value has been determined to represent an invalid entry since prompt 206 is requesting that the user enter a numerical identifier for a month of the year and only integers between 1 and 12 are valid entries. Accordingly, at a determined validation moment associated with GUI 202 and/or user input portion 208, the user input data (or lack thereof) is analyzed to determine if it is valid or invalid. If the user input data is determined to be valid, then the process associated with and/or supported by user input portion 208 is allowed to continue in some manner. If the user input data is determined to be invalid, then a non-modal message 210 is generated and displayed. In the example in FIG. 2, non-modal message 210 takes the shape of a balloon message having a tip pointing to or otherwise directing the user to user portion 208 which currently contains invalid user input data (i.e., the number "15"). Included in this exemplary visible graphical non-modal message 210 is message information that reads "Please enter an integer between 1 and 12".

In accordance with certain aspects of the present invention, when non-modal message 210 is displayed the "focus" of GUI 202 is placed, moved or otherwise applied to user input field 208. Thus, for example, in certain implementations user input portion 208 or the current data therein may be highlighted or changed in some visible manner to help the user to identify the user input portion associated with non-modal message 210. In certain exemplary implementations, a cursor or like visible item can be placed in user input portion 208 and logic supporting GUI 202 operatively configured to receive new/revised user input data.

To better serve the user during this non-modal message guided user input process, non-modal message 210 is maintained/displayed until a valid user input has been provided and/or the focus of GUI 202 is moved/removed from user input portion 208. Unlike conventional non-modal messages the message information remains visible while the user provides new input(s) and until the user provides valid user inputs. Non-modal message 210 is no longer displayed once the user has input valid user input. If the user decides to redirect the focus of GUI 202, then non-modal message 210 will stop being displayed. However, if the user has failed to provide requisite valid user inputs, then non-modal message 210 will be displayed again. The user can change or move the focus of GUI 202 by selectively moving and/or activating a pointing device such as a mouse, touch-pad, trackball, or the like, and/or striking one or more input keys on a keyboard or other like mechanism. For example, in certain implementations, the user may hit a "tab" key to selectively move the focus of GUI 202 to another user input portion.

In still other implementations, the focus of GUI 202 can be automatically moved to another portion within GUI 202. For example, the focus of GUI 202 may change after the passage of a certain amount of time. Non-modal message 210 may also time out in some manner as may be needed.

FIG. 2 also includes a portion of an exemplary GUI 220 further illustrating certain features associated with certain implementations of a non-modal message 224 that is displayed in reference to user input field 222. Here, at an applicable validation moment, it was determined that the user failed to provide requisite valid user input to user input field 222. Hence, non-modal message 224 has been displayed. In this example, non-modal message 224 includes a graphical icon 226, an identifier 228 and message information 230. Graphical icon 226 in this example visibly identifies that an error has occurred. Identifier 228 provides a title or summary, for example, of the error (here, e.g., "Field is mandatory.").

Message information 230 in this example further elaborates on the error by stating that "You must enter a value for Open Build." Although not visually illustrated by the screen shot of GUI 220, the focus of GUI 220 is user input field 222.

Figure 3:
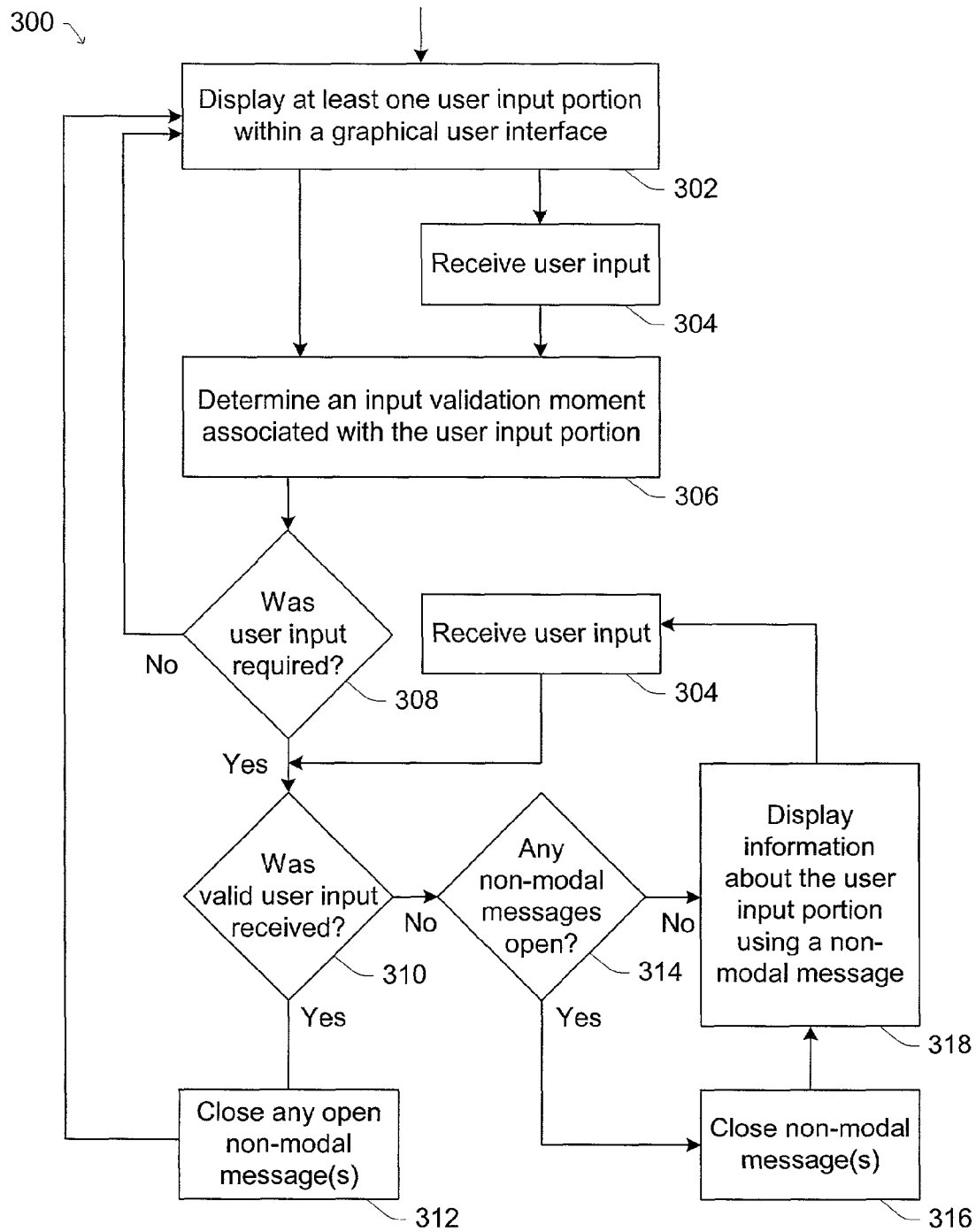
FIG. 3 is a flow diagram depicting a process for displaying information associated with user input portions of a GUI, in accordance with certain exemplary implementations of the present invention.

Attention is now drawn to FIG. 3, which is a flow diagram depicting a process 300 for displaying information associated with user input portions of a GUI, in accordance with certain exemplary implementations of the present invention.

In step 302, at least one user input portion is displayed within a GUI. In step 304, user input associated with the user input portion is received. In step 306, a determination is made that an input validation moment associated with the GUI and/or user input portion has been reached. For example, an input validation moment may be reached after the passage of a period of time with or without user inputs received in step 304. An input validation moment may be associated with the user selecting a particular GUI mechanism, such as, for example, a form "complete" button, an "enter" button, a "submit" button, a "send" button, etc. Note that process 300 may move from step 302 directly to step 306 without step 304, for example, if the user does not provide user input for the user input portion.

In step 308, an inquiry is made to determine if a user input was required for the user input portion. If the answer to the inquiry is "No", then the user input or lack thereof was not required and hence is inherently valid. As such, process 300 may return to step 302, for example, to display or process other user input portions or features of the GUI. If the answer to the inquiry in step 308 is "Yes", then user input is required for the user input portion being analyzed and process 300 continues with step 310.

In step 310 an inquiry is made to determine if the current user input associated with the user input portion is valid. If the received user input is determined to be valid (i.e., the answer to inquiry 310 is "Yes"), then process 300 continues with step 312, wherein if a non-modal message is displayed it is dismissed or closed and process 300 is allowed to return to step 302, for example. If the received user input is determined to be invalid (i.e., the answer to inquiry 310 is "No"), then process 300 continues with step 314. The user input may be invalid if, for example, it is missing (not entered/received yet) and/or it fails to meet certain validation criteria associated with the user input portion.

An inquiry is made in step 314 to determine if any non-modal messages are currently open. If the answer is "Yes", then process 300 continues with step 316, wherein the open non-modal message is closed. From step 316, process 300 proceeds to step 318. If the answer to the inquiry in step 314 is "No", then process 300 continues to step 318.

In step 318, a non-modal message is displayed with regard to the user input portion, which according to the analysis of process 300 currently contains invalid user input and/or is missing valid user input. As part of step 318, the focus of the GUI can be moved or otherwise applied to the user input portion. Following step 318, process 300 continues with step 320, wherein new user input is received. The non-modal message displayed in step 318 is continually displayed until it is subsequently removed in either step 312 or step 316, and/or the focus of the GUI is moved/removed from the user input portion. Following step 320, process 300 returns to step 310 to determine if the newly received user input is valid or invalid.

Figure 4:
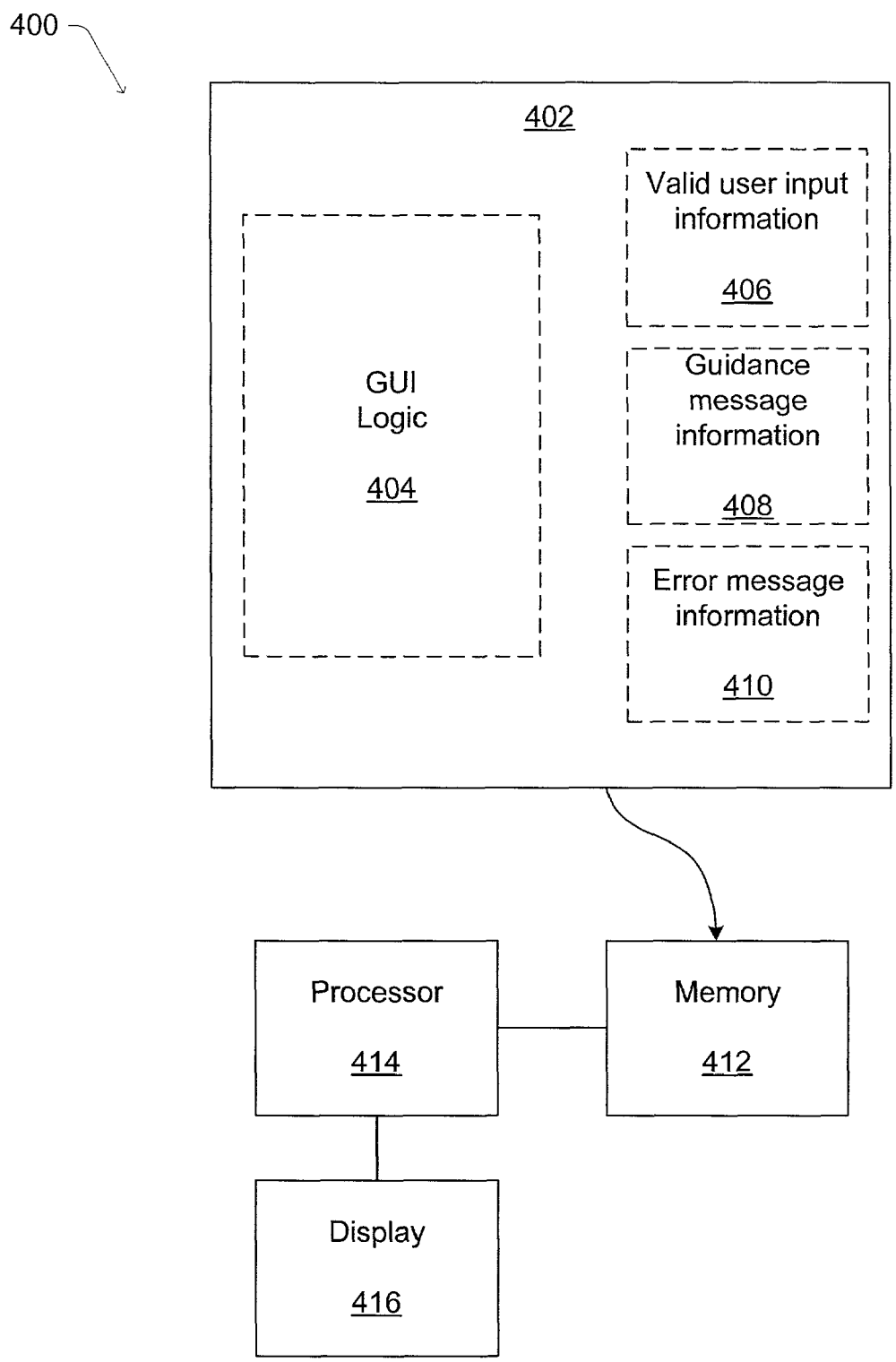
FIG. 4 is a block diagram depicting a device configured to display information associated with user input portions of a GUI, in accordance with certain further exemplary implementations of the present invention.

Reference is now made to FIG. 4, which is a block diagram depicting a device 400 configured to interact with a user and display information associated with user input portions of a GUI, in accordance with certain further exemplary implementations of the present invention.

Device 400 is representative of any device that receives or is otherwise programmable to display/operate according to GUI data 402. GUI data 402 may therefore be provided on a computer-readable media, transmitted over a network, etc. Here, as illustratively represented, GUI data 402 includes GUI logic data 404, valid user input information 406, guidance message information 408, and error message information 410. GUI data 402 includes, for example, the computer-implementable instructions associated with the GUI and/or the process(es) supported by the GUI. Valid user input information 406 includes, for example, information suitable to help GUI data 402 or other associated logic make decisions as in steps 306-310 (FIG. 3) regarding the validity/invalidity of user inputs or lack thereof with respect to the user input portion being analyzed. Thus, for example, valid user input information 406 may define valid (or invalid) types of user inputs. In certain implementations, therefore, valid user input information 406 includes one or more validation/invalidation parameters that can be compared to the current user input to make such decisions.

Guidance message information 408 includes information that is displayed in the non-modal message in step 318. Here, for example, guidance message information 408 may help guide the user to enter valid user input. For example, guidance information may be displayed when the user has failed to input any user input. Error message information 410 includes information that is displayed in the non-modal message in step 318, when a particular error is detected. For example, error information may be displayed when the user has input invalid user input. In certain implementations, guidance message information 408 and error message information 410 are combined.

As illustrated, GUI data 402 is provided to a memory 412 and then processed accordingly by a processor 414 and a corresponding display is presented through a display device 416.

One advantage to GUI data 402 is that a web page or other like markup language file can be downloaded to (client) device 400 over a network. The GUI that is presented can be checked/processed locally to determine if valid input has been received, without requiring additional processing, for example, by sending the user inputs to a server device for validation.

Although some preferred implementations of the various methods and apparatuses of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

The invention claimed is:

1. A method comprising:
    displaying at least one user input portion within a graphical user interface (GUI);
    determining if said user input portion is in an invalid state by determining that valid user input associated with said user input portion has not been received;
    displaying a non-modal message within said GUI, said non-modal message being visibly graphically associated with said user input portion;
    automatically applying a focus of said GUI on said user input portion, wherein said focus is moveable through said GUI from said user input portion when said user input portion is in the invalid state; and as long as said focus of said GUI remains on said user input portion, continue displaying said non-modal message until said user input portion is determined to be in a valid state.

2. The method as recited in claim 1, wherein determining that valid user input associated with said user input portion has not been received further includes:
receiving user input associated with said user input portion; and
comparing said received user input with validation information associated with said user input portion.

3. The method as recited in claim 2, wherein said validation information includes at least one validation parameter.

4. The method as recited in claim 1, wherein said user input portion includes at least one user input field.

5. The method as recited in claim 1, wherein said focus of said GUI places a cursor in said user input portion.

6. The method as recited in claim 1, wherein said focus of said GUI can be moved from said user input portion through focus moving user input.

7. The method as recited in claim 1, wherein said non-modal message includes non-modal information regarding at least one invalidity error associated with said user input portion.

8. The method as recited in claim 7, wherein said non-modal information includes at least one form of identifying information selected from a group of different forms of identifying information comprising a graphical icon, an identifier, and message information.

9. The method as recited in claim 8, wherein said message information includes validation information associated with said user input portion.

10. The method as recited in claim 1, wherein said non-modal message includes a balloon message.

11. A computer-readable medium having computer-executable instructions for performing acts comprising:
causing a graphical user interface (GUI) to be displayed, said GUI having at least one user input portion visibly graphically provided therein;
selectively causing a focus of said GUI to be applied on said user input portion if valid user input associated with said user input portion has not been received, wherein said focus is moveable through said GUI from said user input portion when said user input portion is in the invalid state; and
displaying a non-modal message within said GUI that is visibly graphically connected to said user input portion until said user input portion is determined to be in a valid state, as long as said focus of said GUI remains on said user input portion.

12. The computer-readable medium as recited in claim 11, wherein selectively causing said focus of said GUI to be applied on said user input portion if valid user input associated with said user input portion has not been received further includes:
receiving user input associated with said user input portion; and
comparing said received user input with validation information associated with said user input portion.

13. The computer-readable medium as recited in claim 12, wherein said validation information includes at least one validation parameter.

14. The computer-readable medium as recited in claim 11, wherein said user input portion includes at least one user input field.

15. The computer-readable medium as recited in claim 11, wherein said focus of said GUI places a cursor in said user input portion.

16. The computer-readable medium as recited in claim 11, wherein said focus of said GUI can be moved from said user input portion through focus moving user input.

17. The computer-readable medium as recited in claim 11, wherein said non-modal message includes non-modal information regarding at least one invalidity error associated with said user input portion.

18. The computer-readable medium as recited in claim 17, wherein said non-modal information includes at least one form of identifying information selected from a group of different forms of identifying information comprising a graphical icon, an identifier, and message information.

19. The computer-readable medium as recited in claim 18, wherein said message information includes validation information associated with said user input portion.

20. The computer-readable medium as recited in claim 11, wherein said non-modal message includes a balloon message.

21. An apparatus comprising:
memory;
a display device;
a user input device; and
logic operatively coupled to said memory, said display device and said user input device, said logic being configured to:
cause a graphical user interface (GUI) to be visibly presented via said display device, said GUI including at least one user input portion,
determine if said user input portion is in an invalid state by determining that valid user input associated with said user input portion has not been received,
cause a non-modal message to be presented within said GUI, said non-modal message being visibly associated with said user input portion;
automatically apply a user input focus of said GUI on said user input portion, wherein said focus is moveable through said GUI from said user input portion when said user input portion is in the invalid state; and
while said focus of said GUI remains on said user input portion, continue presenting said non-modal message until said user input portion is determined to be in a valid state.

22. The apparatus as recited in claim 21, wherein said logic is further configured to:
compare user inputs received from said user input device with validation information within said memory, said validation information being associated with said user input portion.

23. The apparatus as recited in claim 22, wherein said validation information includes at least one validation parameter.

24. The apparatus as recited in claim 21, wherein said user input portion includes at least one user input field.

25. The apparatus as recited in claim 21, wherein said user input focus of said GUI causes said logic to visibly associate at least one graphical user input indicator with said user input portion.

26. The apparatus as recited in claim 21, wherein said logic is configured to allow user input focus of said GUI to be removed from said user input portion based on user inputs from said user input device.

27. The apparatus as recited in claim 21, wherein said non-modal message includes non-modal information regarding at least one invalidity error associated with said user input portion.

28. The apparatus as recited in claim 27, wherein said non-modal information includes at least one form of identifying information selected from a group of different forms of identifying information comprising a graphical icon, an identifier, and message information.

29. The apparatus as recited in claim 28, wherein said message information includes validation information associated with said user input portion.

30. The apparatus as recited in claim 21, wherein said non-modal message includes a balloon message.

* * * * *